United States Patent
Feiten et al.

(10) Patent No.: US 10,656,628 B2
(45) Date of Patent: May 19, 2020

(54) CONTROL DEVICE FOR A PRODUCTION MODULE AND A METHOD FOR OPERATING THE CONTROL DEVICE

(71) Applicant: Siemens Aktiengesellschaft, München (DE)

(72) Inventors: Wendelin Feiten, Neubiberg (DE); Kai Wurm, München (DE); Vladimir Zahorcak, Borinka (SK)

(73) Assignee: Siemens Aktiengesellschaft, München (DE)

( * ) Notice: Subject to any disclaimer, the term of this patent is extended or adjusted under 35 U.S.C. 154(b) by 11 days.

(21) Appl. No.: 15/572,990

(22) PCT Filed: May 12, 2015

(86) PCT No.: PCT/EP2015/060418
§ 371 (c)(1),
(2) Date: Nov. 9, 2017

(87) PCT Pub. No.: WO2016/180478
PCT Pub. Date: Nov. 17, 2016

(65) Prior Publication Data
US 2018/0113443 A1 Apr. 26, 2018

(51) Int. Cl.
*G05B 19/418* (2006.01)

(52) U.S. Cl.
CPC ........ *G05B 19/41815* (2013.01); *G05B 2219/31089* (2013.01); *G05B 2219/39116* (2013.01);
(Continued)

(58) Field of Classification Search
CPC .................. Y20P 90/08; Y20P 90/10
See application file for complete search history.

(56) References Cited

U.S. PATENT DOCUMENTS 3,891,836 A 6/1975 Lee
6,272,391 B1 * 8/2001 Maturana ......... G05B 19/41865
700/103
(Continued)

FOREIGN PATENT DOCUMENTS

CN 1637738 A 7/2005
CN 101007471 A 8/2007
(Continued)

OTHER PUBLICATIONS

International Search Report for PCT Application No. PCT/EP2015/060418, dated Feb. 4, 2016.
(Continued)

*Primary Examiner* — Robert E Fennema
*Assistant Examiner* — Jonathan Michael Skrzycki
(74) *Attorney, Agent, or Firm* — Schmeiser, Olsen & Watts LLP

(57) ABSTRACT

A control device for a production module that has a settings management module for detecting restrictions for operating settings of the production module and for producing corresponding restriction data records is provided. A data memory is provided for the purpose of storing a local restriction table containing a multiplicity of restriction data records. A balancing module is used to iteratively read in first restriction data records in a corresponding restriction table of a first adjacent production module, to iteratively build the local restriction table on the basis of the first restriction data records which have been read in and to iteratively forward second restriction data records in the local restriction table to a second adjacent production module. A control module is also provided for the purpose of setting an operating setting according to a restriction data record which identifies this operating setting.

16 Claims, 4 Drawing Sheets

(52) U.S. Cl.
CPC .............. *G05B 2219/39146* (2013.01); *G05B 2219/40359* (2013.01); *Y02P 90/08* (2015.11); *Y02P 90/10* (2015.11)

(56) References Cited

U.S. PATENT DOCUMENTS

| | | | |
|---|---|---|---|
| 6,427,221 | B1 | 7/2002 | Maturana |
| 10,088,837 | B1* | 10/2018 | Strain .............. G05B 19/41865 |
| 2002/0138673 | A1 | 9/2002 | Schaffer et al. |
| 2004/0010339 | A1 | 1/2004 | Mountz |
| 2005/0010388 | A1 | 1/2005 | Bagchi et al. |
| 2006/0227350 | A1* | 10/2006 | Crawford ........... G05B 19/4185 358/1.12 |
| 2007/0162601 | A1 | 7/2007 | Pendarakis et al. |
| 2009/0105855 | A1 | 4/2009 | Mehta et al. |
| 2009/0319070 | A1 | 12/2009 | Morningred et al. |
| 2012/0029656 | A1 | 2/2012 | Colombo et al. |
| 2014/0024302 | A1 | 1/2014 | Aandewiel et al. |
| 2014/0128996 | A1 | 5/2014 | Sayyarrodsari et al. |
| 2014/0309793 | A1 | 10/2014 | Cheng et al. |
| 2018/0210411 | A1 | 7/2018 | Felten et al. |

FOREIGN PATENT DOCUMENTS

| | | | |
|---|---|---|---|
| CN | 101126693 | A | 2/2008 |
| CN | 101356502 | A | 1/2009 |
| CN | 101533273 | A | 9/2009 |
| CN | 102124484 | A | 7/2011 |
| CN | 103535424 | A | 1/2014 |
| CN | 103809438 | A | 5/2014 |
| CN | 104116129 | A | 10/2014 |
| CN | 104444360 | A | 3/2015 |
| DE | 102008037446 | A1 | 5/2010 |
| JP | H0283702 | A | 3/1990 |
| JP | H0944471 | A | 2/1997 |
| JP | H09244727 | A | 9/1997 |
| JP | 2001273022 | A | 10/2001 |
| JP | 2002116816 | A | 4/2002 |
| JP | 2002283154 | A | 10/2002 |
| JP | 2002367875 | A | 12/2002 |
| WO | WO 0019350 | A1 | 4/2000 |
| WO | 2005062145 | A1 | 7/2005 |
| WO | 2017000173 | A1 | 1/2017 |

OTHER PUBLICATIONS

Non-English Chinese Office Action for application No. 201580079852.7 dated Jun. 5, 2019.
Stokic, D. et al: "Self-Learning Embedded Services for Integration of Complex, Flexible Production Systems"; IECON 2011—37th Annual Conference on IEEE Industrial Electronics Society; 2011; pp. 415-420; DOI: 10.1109/IECON.2011.6119346; 2011.
International Search Report dated Jul. 19, 2016 corresponding to PCT International Application No. PCT/EP2016/063437.
Japanese Office Action dated Jun. 12, 2018 for Application No. 2017-564116.
Japanese Office Action for Application No. 2017-564116, dated Sep. 4, 2018.
Non-Final Office Action for application No. 15/738,592 (filed Dec. 21, 2017) dated Apr. 19, 2019.

* cited by examiner

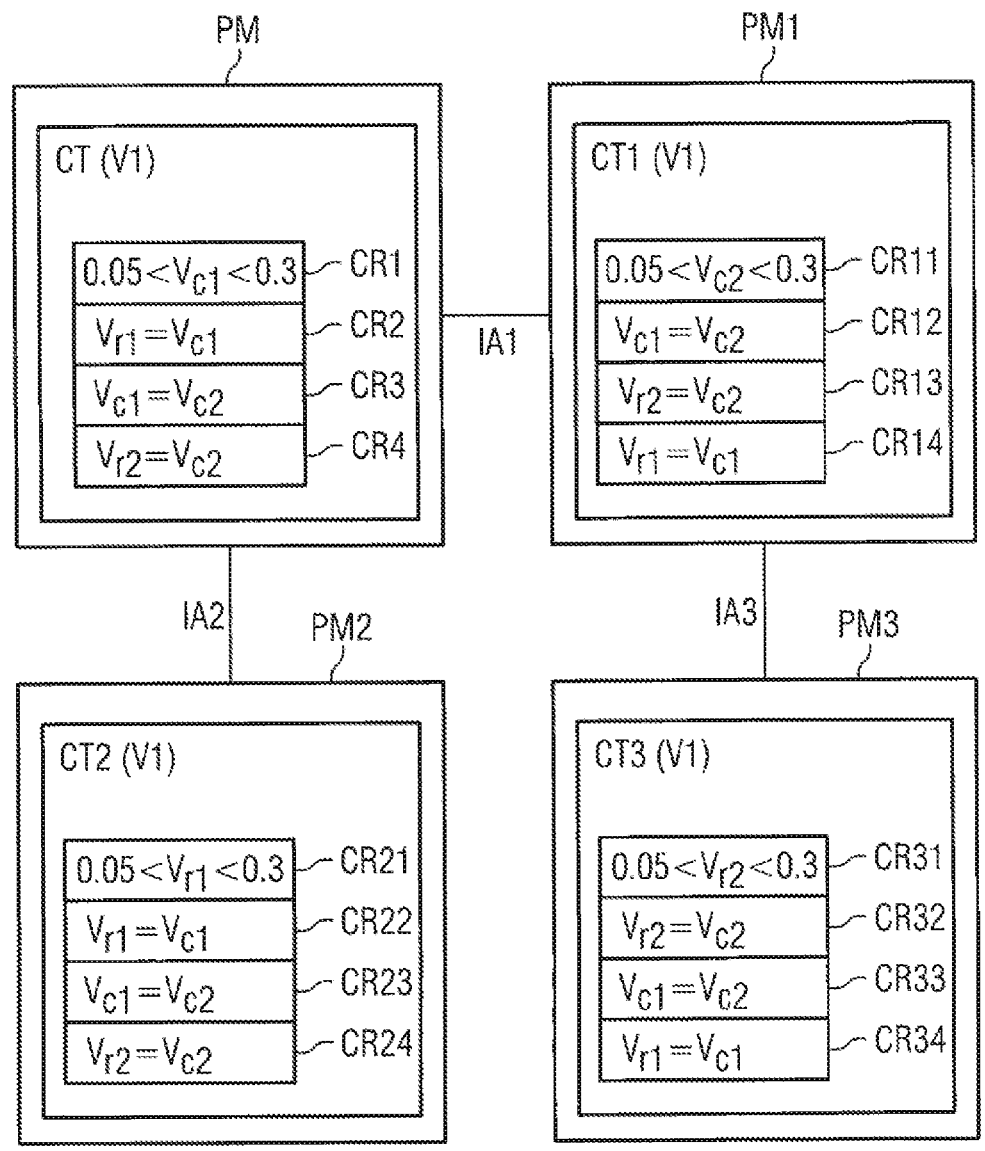

CONTROL DEVICE FOR A PRODUCTION MODULE AND A METHOD FOR OPERATING THE CONTROL DEVICE

CROSS-REFERENCE TO RELATED APPLICATIONS

This application claims priority to PCT Application No. PCT/EP2015/060418, having a filing date of May 12, 2015, the entire contents of both of which are hereby incorporated by reference.

FIELD OF TECHNOLOGY

Modern production systems for manufacturing or processing technical products typically include a multiplicity of specific, interacting production modules and are becoming increasingly complex. Typically, many processing, production or handling steps must be performed on a product that is to be manufactured or processed, for which many production modules designed specially for the given purpose are provided in the production system, including for example robots, CNC machines, 3D printers, reactors, burners, heating systems or conveyor belts. The specific functionalities of the production modules are also called production services.

BACKGROUND

The production modules are adapted to a specific production environment and/or specific products with the aid of operating settings, that is to say settings of the operating parameters thereof. In this context, the operating settings are typically subject to a multiplicity of constraints, which may be imposed by structural features or may result from an interaction of a production module with a product or with another production module. In particular, operating settings of different production modules that have not been synchronized can lead to setting conflicts.

It is known to manage the operating settings of production modules centrally in the production system. In practice, this often involves calculating suitable conflict-avoiding operating settings manually with the assistance of experienced machine setters.

However, a modification, failure, replacement, addition of a production module in the production system, or a product-related changes often entail new or altered constraints for some operating settings, which can also result in conflicts of different operating settings. If such a conflict is not resolved promptly, it may result in stoppage times for the production system. Such stoppage times of the production system may also occur if a central management of the production system malfunctions.

SUMMARY

An aspect relates to specifying a control device for a production module, a production module and a method for operating the control device which are able to respond flexibly to changes in the production system.

According to embodiments of the invention, a control device for a production module for processing or handling a product in a production system comprising a multiplicity of production modules, a production module and a method for operating the control device are provided.

For the present purposes, a product may be for example a workpiece or any other product in various phases of a manufacturing, processing or working process and in particular also a starting, intermediate or final product. The production module may in particular be an apparatus of a production system that contributes to the production, processing, working and/or handling of a product and has a specific functionality, for example a robot, a CNC machine, a 3D printer, a reactor, a burner, a heating system, a conveyor belt or other transport module.

The control device according to embodiments of the invention is equipped with a settings management module for detecting constraints which must be complied with by operating settings of the production module, and for the respective generation of a constraint data record which specifies a detected constraint and identifies the operating setting restricted thereby. In addition, a data memory is provided for storing a local constraints table with a multiplicity of constraint data records. A synchronizing module is used to iteratively read in first constraint data records of a corresponding constraints table of a first adjacent production module, to iteratively build the local constraints table on the basis of the read-in first constraint data records, by synchronizing them with constraint data records stored of the local constraints table, and to iteratively forward second constraint data records of the local constraints table to a second adjacent production module. In this context, the first adjacent production module can also be identical to the second adjacent production module. A control module is also provided for setting an operating setting according to a constraint data record of the local constraints table which identifies said operating setting.

The production module according to embodiments of the invention comprise the control device according to the invention.

The method steps that are to be carried out by the control device according to the invention are the object of the method according to embodiments of the invention.

It may be considered an essential advantage of embodiments of the invention that information about constraints on operating settings may be distributed successively via the production system by local communication between adjacent production modules. In particular, changes to these constraints that are caused by changes in the production system may be distributed efficiently via the production system. A central management is not needed for this. In this way, in many cases the cost of setting up or changing the production system can be reduced significantly.

According to an advantageous embodiment of the invention, a respective constraint data record may comprise an identifier for identifying the operating setting and/or a range indicator or value indicator for specifying the constraint. In particular, the identifier and/or range indicator or value indicator may be presented in a preferably standardized normal form, to simplify synchronization with other constraint data records presented in this normal form.

The settings management module may also be configured to specifically detect constraints that are imposed by the production module itself, and to generate local constraint data records therefrom. The synchronizing module may be configured correspondingly to initialize the local constraints table with the local constraint data records. In this way, the local constraints table may already be initialized before an interaction between the production module and products or adjacent production modules takes place.

The settings management module may further be configured to specifically detect constraints imposed by interaction between the production module and the product and/or an adjacent production module, and to generate interaction-related constraint data records therefrom. The synchronizing module may be configured correspondingly to synchronize the interaction-related constraint data records with the constraint data records stored in the local constraints table. In this way, the production module may be adapted flexibly to an existing environment in the production system.

The synchronizing module may advantageously be configured to identify constraints relating to the respective same operating setting from constraint data records for synchronizing said constraint data records and to combine the identified constraint data records in an overall constraint for this operating setting. A constraint data record indicating the overall constraint may be stored correspondingly in the local constraints table.

According to an advantageous embodiment of the invention, the settings management module may be configured to dynamically detect a product and/or an adjacent production module. A change notification may be generated by the settings management module in response to such detection and transmitted to the synchronizing module and/or an adjacent production module. In this context, the settings management module may particularly be configured to initiate the capture of constraints imposed by interaction of the production module with the product and/or with the adjacent production module following such detection. In this way, the production module may be adapted flexibly to an existing and/or changed environment in the production system.

The synchronizing module may also be configured to perform an iteration step in response to receipt of a change notification when the first constraint data records are read in, when the local constraints table is built and/or when the second constraint data records are forwarded.

According to an advantageous embodiment of the invention, the local constraints table may contain version information which is changed in response to receipt of a change notification and/or in response to the performance of an iteration step when the first constraint data records are read in, when the local constraints table is built and/or when the second constraint data records are forwarded. The version information may specify a version of the local constraints table and/or indicate the versions of corresponding constraints tables of adjacent production modules on which the local constraints table is based. In particular, the synchronizing module may be configured to compare the version information of the local constraints table with a version of a respective first constraint data record when building said local constraints table, and to update the local constraints table and/or forward one of the second constraint data records depending on said comparison. With a version management system of such kind, it is typically possible to ensure that constraint data records and constraints tables are only updated when data that is truly more recent is present.

The synchronizing module may also be configured to determine whether the local constraints table is changed during updating as part of the iterative building, and if this is not true to identify a set of operating settings that satisfy the constraints indicated in the local constraints table. As soon as the local constraints table no longer changes during an update, in many cases it may be assumed that all directly or indirectly contributing constraints from production modules have already been complied with. Accordingly, after such a determination the identification of a set of operating settings that is actually to be used may be initiated.

It may further be provided that at least one of the constraint data records contains an origin notification regarding a constraint, which notification indicates the production module that is the source of this constraint. The synchronizing module may be configured correspondingly to specifically update a constraint data record with an origin notification indicating a production module upon receipt of a change notification relating to that production module. In this way, not all constraint data records in the local constraints table must be searched. Instead, a search may be limited to data records with matching origin information.

BRIEF DESCRIPTION

Some of the embodiments will be described in detail, with reference to the following figures, wherein like designations denote like members, wherein:

FIG. 4 depicts the local constraints tables after synchronization, in accordance with embodiments of the present invention.

DETAILED DESCRIPTION

Figure 1:
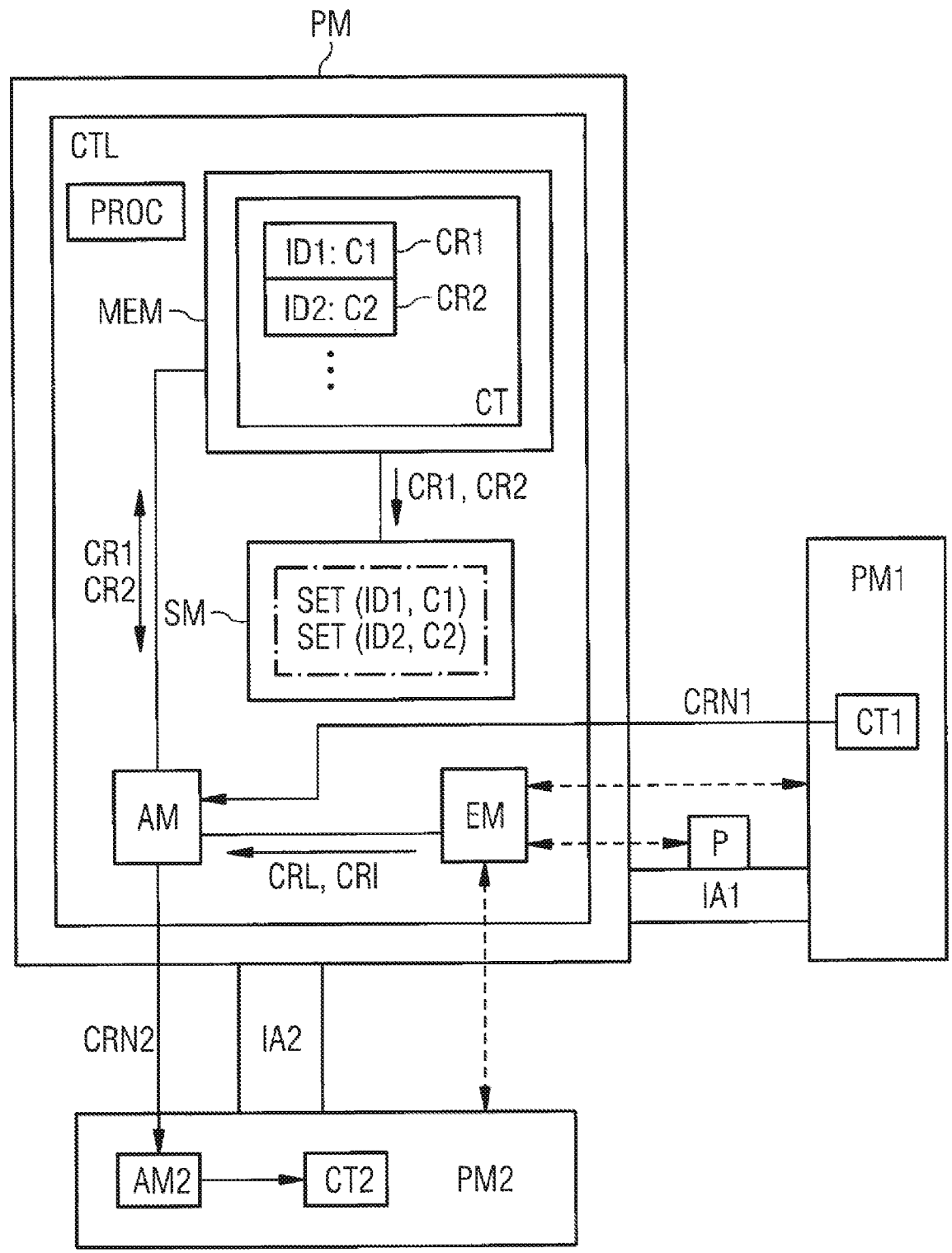
FIG. 1 depicts a production module with a control device which cooperates with adjacent production modules, in accordance with embodiments of the present invention.

FIG. 1 illustrates a production module PM with a control device CTL according embodiments of to the invention which cooperates with adjacent production modules PM1 and PM2 of a production system. Production modules PM, PM1 and PM2 are used to process or handle a product P in the production system. Such a production system, for example a production line for manufacturing, processing or working workpieces or other products typically comprises a multiplicity of production modules with specific functionality. Product P may be a workpiece or generally any particularly physical product in various phases of a manufacturing, processing or working process, also in particular a starting, intermediate or final product. The adjacent production modules PM1 and PM2 may be adjacent to production module PM spatially or logically.

Production modules PM, PM1 and PM2 may each individually be an apparatus of the production system which contributes to the production, processing, working and/or handling of the product with specific functionality, for example a robot, a CNC machine, a 3D printer, a reactor, a burner, a heating system or a conveyor belt or other transport module in each case. In particular, each such production module PM, PM1 and PM2 may be a "Cyber Physical Module" (CPM) or "Cyber Physical Production Module" (CPPM).

Production module PM interacts with adjacent production module PM1 in an interaction area IA1 and with adjacent production module PM2 in an interaction area IA2. In this context, each such interaction may also extend to products, denoted with P here, that are located in the respective interaction area IA1 or IA2. Interaction areas IA1 and IA2 are each a spatial or logical area which is accessible to a plurality of production modules or can be influenced by a plurality of production modules, e.g., a transfer area between a robot arm and a conveyor belt or between two robot arms. In such interaction areas, denoted here with IA1 and IA2, it is typically essential to synchronize the movements or other operating settings of the production modules that interact there. In particular, a freedom of movement or clearance of an another operating setting of a production module is usually constrained by the interaction with an adjacent production module. Such initially locally occurring constraints may also often have effects on production modules of the production system which are not immediately adjacent, to the extent that a production module often interacts with multiple adjacent production modules. Accordingly, an interaction with a first of the adjacent production modules may be subject to constraints that result from constraints of an interaction with a second of the adjacent production modules. Therefore, beginning with a set of individual constraints for production modules, the objective is to determine a set of operating settings which as far as possible satisfy all constraints from production modules of the production system.

An operating setting in the above sense may be understood to mean a setting of operating characteristics and/or operating parameters of a production module, in particular a setting of physical parameters, control variables, regulating variables and/or process variables. Such operating characteristics or operating parameters may be for example a speed, an acceleration, a position and/or an orientation of a product or handling device of a production module. Operating parameters such as the dimensions, pressure, temperature etc. of an interaction area may also be treated as operating settings.

A constraint within the meaning given above is an operating constraint which must be observed for a respective operating setting, for example a value indicator or a range indicator for physical or logical variables, or a physical secondary condition. Such a constraint may be represented or modeled for example by an equation or an inequation. Thus for example, a permissible speed range or speed value may be specified as a constraint for an operating setting for a speed. In such a case, it may be required as an additional secondary condition for example that a robot arm speed and a conveyor belt speed are substantially equal during a product transfer.

In general, constraints of such kind may be differentiated according to their cause. On the one hand for example, there are constraints that are imposed by a respective production module itself. These may be in particular structure-related constraints, such as the minimum speed or maximum speed of a conveyor belt.

On the other hand, there are constraints which arise due to the interaction of a given production module with a given product. These are typically specific to a product and are contained in a model of a production process for the product. Thus for example during transport of a bottle that has been filled but not yet closed it must be ensured that the bottle is kept substantially upright and that an upper limit for accelerating the bottle is observed.

In addition, there are constraints which arise as a result of interaction between two or more production modules. Thus for example, as a rule the speeds of the handling apparatuses in the delivering and the receiving production modules should be substantially the same when products are transferred between two production modules.

There are still other constraints which are imposed by the production system or by an environment of the production module, e.g., an upper limit for power consumption of the overall production system.

To the extent that the operating settings of adjacent production units exert a mutual influence on each other, the constraints of adjacent production units are linked to each other and accordingly exert a mutual influence. Therefore, the constraints of one production module may also indirectly influence the constraints of production modules which are not directly adjacent, potentially across the entire production system. According to embodiments of the invention, the constraints of the production modules, preferably all production modules in the production system, are calculated iteratively from locally calculated constraints of the production modules.

In the present exemplary embodiment, production modules PM1 and PM2 each comprise a control device corresponding to the control device CTL of production module PM. The control devices of production modules PM1 and PM2 are not represented in FIG. 1 in order to preserve clarity.

The control device CTL of production module PM has a data memory MEM that contains a local constraints table CT. Local constraints table CT comprises a multiplicity of constraint data records CR1, CR2, . . . , stored therein, for locally imposed constraints and for constraints from directly and indirectly adjacent production modules, in this case PM1 and PM2. In particular, local constraints table CT may also contain non-local and global constraints.

Constraint data record CR1 comprises an identifier ID1, which identifies a specific operating setting, for example "$V_c$" for a conveyor belt speed. Identifier ID1 is assigned a constraint specification C1 which defines a constraint imposed on the operating setting identified with ID1, for example a value range or value interval for the possible speed of a conveyor belt. Similarly, constraint data record CR2 comprises an identifier ID2, which identifies a further operating setting and assigns a constraint specification C2 to it, which defines a constraint for this operating setting. A constraint data record CR1 or CR2 may preferably contain an origin notification which identifies the production module that necessitates this constraint.

Adjacent production module PM1 accordingly contains a corresponding constraints table CT1 and adjacent production module PM2 contains a corresponding constraints table CT2. From the point of view of their respective production module, PM1 and PM2 respectively, both constraints tables CT1 and CT2 are local constraints tables.

In order to execute all method steps, control device CTL is equipped with a processor PROC.

Control device CTL also has a settings management module EM for dynamically detecting constraints that must be complied with by operating settings of the production module PM, and for the respective generation of a constraint data record which specifies the detected constraint and identifies the operating setting restricted thereby.

In particular, the settings management module serves specifically to detect local constraints imposed by the production module PM itself and generate local constraint data records therefrom. Settings management module EM also dynamically detects production modules PM1 and PM2—as indicated by dashed double arrows in FIG. 1—and the product P located in interaction area IA1. Based on these detections, settings management module EM detects constraints specifically which are imposed by the interaction of production module PM with product P and with the adjacent production modules PM1 and PM2, and generates interaction-related constraint data records CRI therefrom. The local and interaction-related constraint data records CRL and CRI are transmitted to a synchronizing module AM by the settings management module EM, and the synchronizing module triggers their storage in local constraints table CT.

Synchronizing module AM of control device CTL is coupled to data memory MEM and to settings management module EM. Synchronizing module AM serves for event-controlled, iterative reading-in of first constraint data records CRN1 of the corresponding constraints table CT1, for iterative building and updating of the local constraints table CT based on the read-in first constraint data records CRN1, and for iterative forwarding of second constraint data records CRN2 from local constraints table CT to the adjacent production module PM2. In this process, second constraint data records CRN2 are transmitted to a synchronizing module AM2 which corresponds to the synchronizing module AM in production module PM2. Synchronizing module AM2 then initiates an update of constraints table CT2 on the basis of the transmitted second constraint data records CRN2.

Constraints table CT is initialized by synchronizing module AM on the basis of the local constraints from local constraint data records CRL. The constraint data records CR1, CR2, . . . contained in constraints table CT are also compared with the constraints of the interaction-related constraint data records CRI by synchronizing module AM. For this purpose, the constraint data records CR1, CR2, . . . stored in the constraints table are retrieved by synchronizing module AM and returned to memory in updated form.

Control device CTL is further equipped with a control module SM for setting operating settings of production module PM according to the constraint data records CR1, CR2 . . . stored in constraints table CT.

Figure 2:
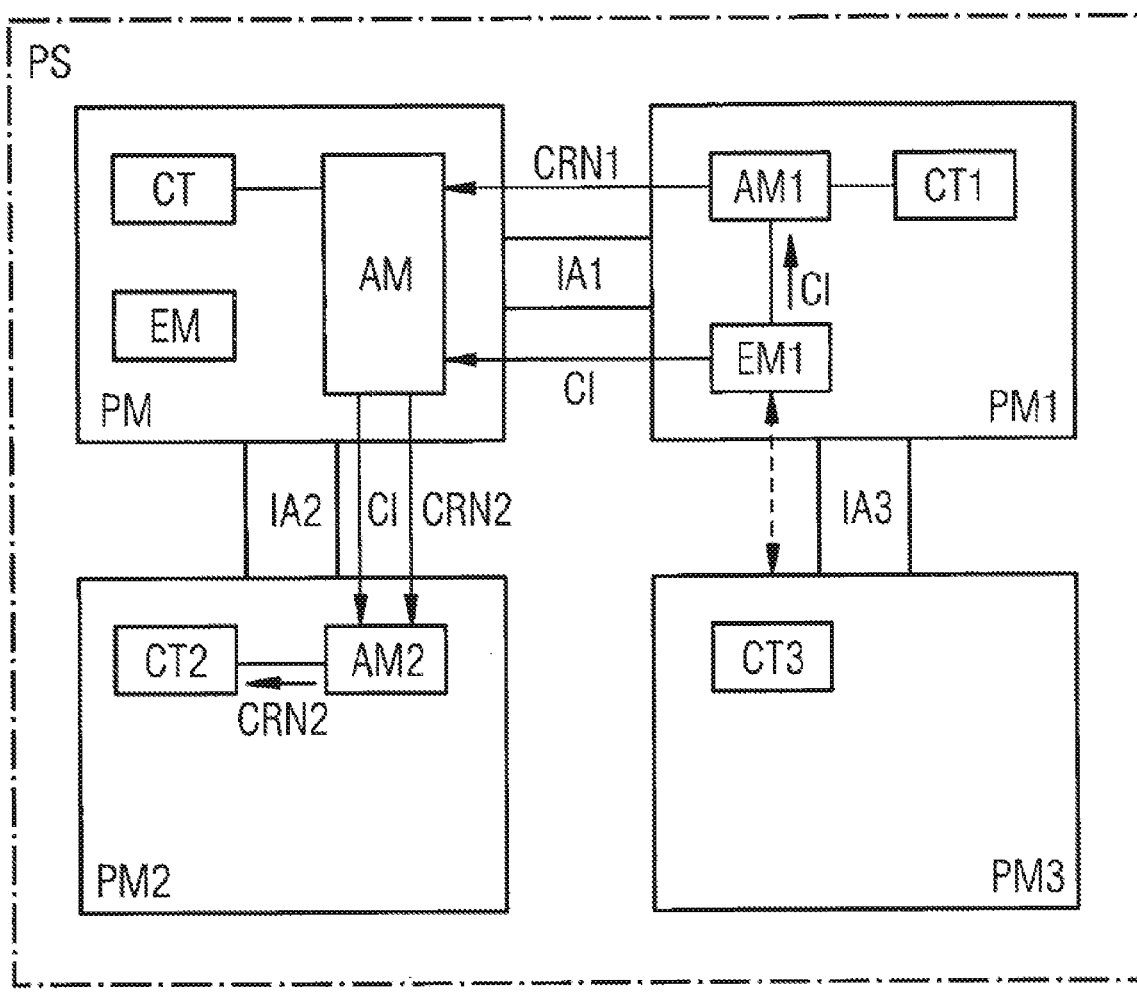
FIG. 2 depicts a production system with a plurality of production modules, in accordance with embodiments of the present invention.

FIG. 2 schematically shows a production system PS having a multiplicity of production modules, in this case PM, PM1, PM2 and PM3 for exemplary purposes. Let it be assumed that production modules PM1, PM2 and PM3 are equipped with a control device CTL according to embodiments of the invention like production module PM, which is not represented in FIG. 2 to preserve clarity. Otherwise, the reference signs used in FIG. 2 that correspond to those of FIG. 1 denote the same objects as in FIG. 1.

Production module PM3 is adjacent to production module PM1 and shares a common interaction area IA3 therewith. Production module PM3 also has a local constraints table CT3 for this production module.

Production module PM1 has a synchronizing module AM1 and a settings management module EM1 coupled thereto.

As indicated by a dashed double arrow, settings management module EM1 of production module PM1 dynamically detects adjacent production module PM3 and generates a change notification CI on the basis of this detection. Such a detection may take place particularly when production module PM3 is reconnected to production module PM1. Similarly, change notification CI may also be generated when a product P is detected in interaction area IA3. Change notification CI is transmitted by settings management module EM1 to synchronizing module AM1 and to the synchronizing module AM of production module PM. In this way, settings management module EM1 initiates capture of constraints imposed by the interaction of production module PM1 with the product and/or with the adjacent production module PM3. On the basis of receipt of change notification CI, synchronizing modules AM and AM1 perform an iteration step when reading in first constraint data records, in this case CRN1, when building or updating the local constraints tables, in this case CT and CT1, and/or when forwarding the second constraint data records, in this case CRN2. On the basis of receipt of change notification CI, synchronizing module AM transmits change notification CI to synchronizing module AM2 of production module PM2, thereby triggering a corresponding update of constraints table CT2 on the basis of the second constraint data records CRN2, which are also transmitted. Synchronizing modules AM, AM1 and AM2 each perform the iterative synchronization locally, in the same way and in parallel with each other. Accordingly, central or global control or synchronization of this synchronization process is not needed.

Figure 3:
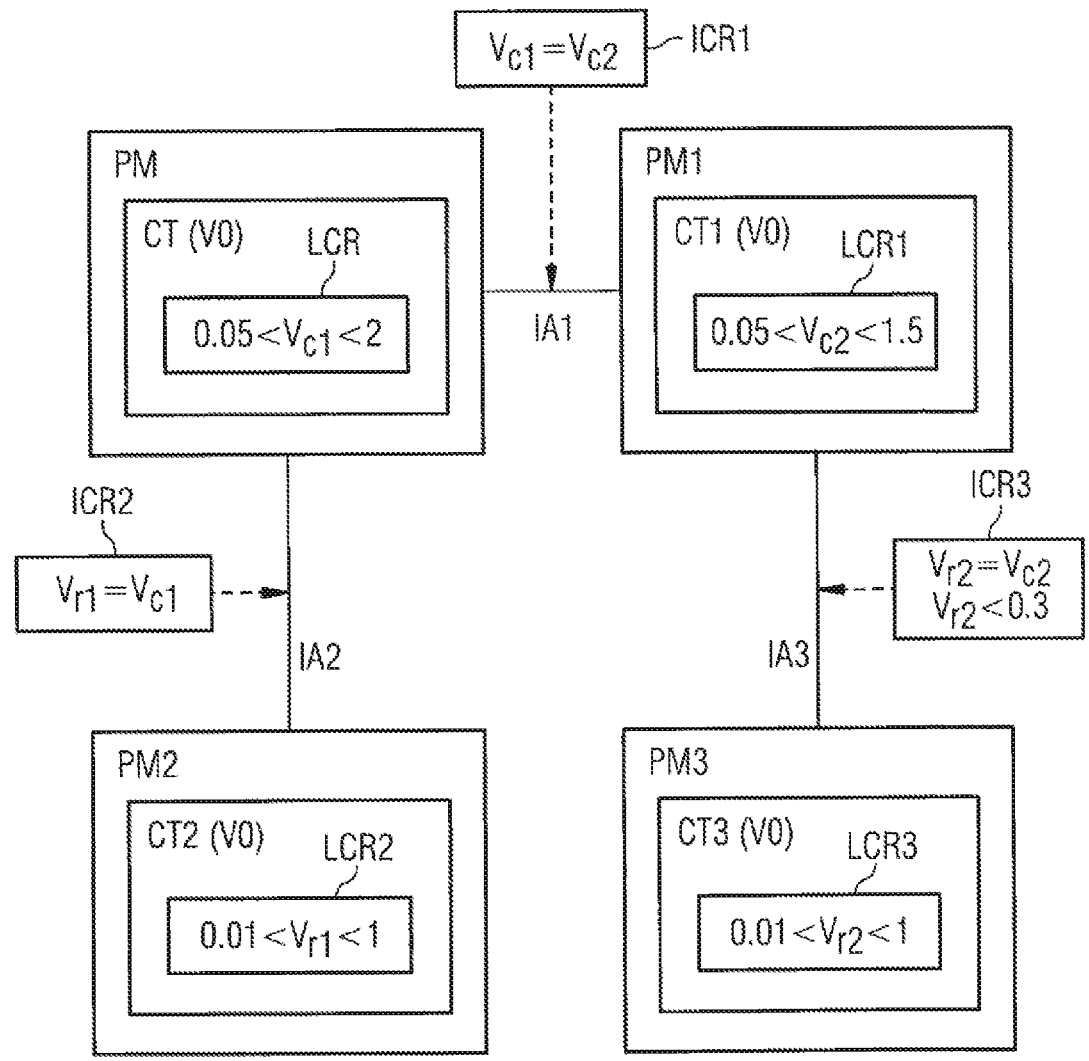
FIG. 3 depicts local constraints tables of various production modules before synchronization, in accordance with embodiments of the present invention.

FIG. 3 is a schematic representation of the local constraints tables CT, CT1, CT2 and CT3 of production modules PM, PM1, PM2 and PM3 respectively before constraints tables CT, CT1, CT2 and CT3 are synchronized. In FIG. 3, reference signs that match the reference signs in FIG. 1 or FIG. 2 denote the same object in each case.

Constraints tables CT, CT1, CT2 and CT3 each contain at least one local constraint data record LCR, LCR1, LCR2 and LCR3 respectively, each of which is generated from a constraint imposed by the respective production module PM, PM1, PM2 and PM3. An operating setting that is restricted by a respective local constraint data record LCR1, . . . , LCR3 is identified with an identifier.

In the present exemplary embodiment, production module PM detects a local constraint for a speed of a local, first conveyor belt identified with an identifier $V_{c1}$ and generates local constraint data record LCR therefrom. In constraint data record LCR, speed $V_{c1}$ is restricted to a speed range from 0.05 to 2 (units are arbitrary).

In similar manner thereto, a speed of a local, second conveyor belt of production module PM1 identified with an identifier $V_{c2}$ is restricted to a speed between 0.05 and 1.5 by local constraint data record LCR1 in constraints table CT1.

Local constraint data record LCR2 of constraints table CT2 serves to restrict a speed of a local, first robot arm of production module PM2 identified with identifier $V_{r1}$ to a permitted value range from 0.01 to 1.

Finally, local constraint data record LCR3 of constraints table CT3 serves to restrict a constraint on a speed of a local, second robot arm of production module PM3 identified with identifier $V_{r2}$ to a value range between 0.01 and 1.

Constraints tables CT, . . . , CT3 are each initialized by the local constraint data records LCR, LCR3. In this process, a unique initial version number—for example the digit 0—is assigned to each of constraints tables CT, . . . , CT3 as version information V0.

The interaction of production modules PM1, PM3 across interaction areas IA1, IA2 and IA3 gives rise to various new constraints on the operating settings. In the present exemplary embodiment, the interaction of production modules PM and PM1 across interaction area IA1 requires that the speeds of the first conveyor belt and the second conveyor belt are substantially the same, that is to say $V_{c1}=V_{c2}$.

The interaction of production modules PM and PM2 across interaction area IA2 further requires that the speeds of the first robot arm and of the first conveyor belt are substantially the same, that is to say $V_{r1}=V_{c1}$.

Moreover, the interaction of production modules PM1 and PM3 across interaction area IA3 requires that the speeds of the first and second conveyor belts are substantially the same and less than 0.3, that is to say $V_{r2}=V_{c2}$ and $V_{r2}<0.3$.

The abovementioned interaction-related constraints are detected by the settings management module of the respective production module PM, PM1, PM2 and PM3 respectively, and interaction-related constraint data records ICR1, ICR2 and ICR3 respectively are generated therefrom. These records are transmitted to the synchronizing module of the respective production module PM, . . . , PM3. The respective synchronizing module then synchronizes each interaction-related constraint data record ICR1, ICR2 and ICR3 with the constraint data records (in this case LCR, LCR3) stored in the respective constraints table CT, CT1, CT2 and CT3. On the basis of this synchronization, the respective synchronizing module preferably initiates an iteration step when first constraint data records CRN1 are read in, when the local constraints table is built, and/or when second constraint data records CRN2 are forwarded. In this way, updated constraint data records CRN1 and/or CRN2 are transmitted between adjacent production modules and synchronized with a respective local constraints table.

In order to synchronize constraint data records, first identifiers that identify operating settings are compared and constraints that apply to the same operating setting are linked to each other. Such a linking may be performed for example by forming an intersecting quantity or intersecting interval for different value ranges or value intervals, and/or connecting them with an AND link. An overall constraint resulting therefrom then satisfies all of the conditions of the linked constraints. A normal form may advantageously be provided for indicating constraints, which typically makes it easier to create an overall constraint.

The version information of a given constraints table CT, ..., CT3 is changed, incremented for example, upon completion of a synchronization and/or iteration step if such causes the constraints to change. It may further be provided that a stored constraint data record is only updated if an updating constraint data record contains more recent version information than the respective constraints table and/or a respective constraint data record to be updated.

The iterative synchronization is repeated until a respective constraints table CT, ..., CT3 no longer changes when it is updated, causing the method to converge and terminate. In this way, the constraints of both local and non-local operating settings are communicated successively and adaptively throughout the entire production system via local communication between adjacent production modules. Because the method is carried out in decentralized manner and locally, a central control instance for propagating the constraints is not needed.

FIG. 4 is a schematic representation of local constraints tables CT, CT1, CT2 and CT3 of production modules PM, PM1, PM2 and PM3 after the synchronization has been completed. In FIG. 4 as well, the reference signs that match the reference signs in FIGS. 1 to 3 denote the same objects.

After the convergence of the iterative synchronization, all constraints tables CT, CT1, CT2 and CT3 contain the same constraints for the operating settings of the directly or indirectly interacting production modules PM, PM1, PM2 and PM3. Thus, except for their sequence, the contents of constraint data records CR1, CR2, CR3 and CR4 in constraints table CT match the contents of constraint data records CR11, CR12, CR13 and CR14 of constraints table CT1, the constraint data records CR21, CR22, CR23, CR24 of constraints table CT2 and the constraint data records CR31, CR32, CR33 and CR34 of constraints table CT3.

Updated version information V1, incremented with respect to the initial version information V0, is assigned to constraints tables CT, ..., CT3 on the basis of the synchronization. Besides a version indicator relating to the respective local constraints table, version information V1 preferably also contains an indication of which versions of the corresponding constraints tables of adjacent production modules the respective constraints table is based on.

A given item of version information may preferably be represented by one or more version numbers, which are managed as follows:

As soon as an interaction between a production module and a product imposes an interaction-related constraint, this constraint is entered in the constraints table of the production module concerned, and the version number of that constraints table is incremented.

In the case of constraints which are imposed by an interaction between two or more production modules, these are entered in the constraints tables of all the production modules concerned and the version numbers of these constraints tables are incremented. In particular, an entry is made in the constraints table of a respective production module indicating the versions of the constraints tables of the adjacent production modules on which it is based.

When a new version number which is higher than the version number of the local constraints table is assigned to the constraints table in one of the adjacent production modules, the local constraints table is updated in line with the constraints table with the higher version number. If a difference is found to exist between this updated constraints table and the original constraints table, the version number of that constraints table is also incremented. This can in turn trigger an update of the constraints tables of interacting production modules prompted by the transfer of change notifications and/or first and/or second constraint data records.

When the constraints tables no longer change after a finite number of such updates, said constraints tables contain a totality of those constraints for other production modules that are in a direct or indirect interaction relationship with the production unit concerned.

If any such exist, those operating settings that satisfy all of the constraints contained in a constraints table may be calculated efficiently with standardized computing methods, by "merging" normal forms or with simplex processes, for example. As a rule, the operating settings found for a respective production module are therefore also permissible throughout the entire production system, which means that they satisfy all constraints of the production system that have an effect on these operating settings.

The assignment of the production modules may often change in the course of a production cycle. For example, production steps may be completed, products may be transferred between various production modules and/or production of new products may be started. Accordingly, it is not unusual for earlier constraints to fall out of use and other, new constraints to be added. This brings about changes in the constraints tables as well. According to embodiments of the invention, after such a change the method for updating the constraints tables is repeated and continued until the constraints tables no longer change. As was described previously, the version numbers are incremented successively in this process as well.

Compared with a central management of the constraints applied to operating settings, embodiments of the invention described in the preceding text has proven to offer advantages to the extent that a global behavior of the production system can be determined and organizes itself to some degree in decentralized manner from local characteristics of production modules. This particularly reduces the effort involved in setting up the production system.

The decentralized synchronization of the constraints tables according to embodiments of the invention also helps to make the production system less vulnerable to interfering factors. For example, if a production module malfunctions, a topology of the production system and the version numbers of the constraints tables change. These changes are propagated throughout the entire production system in decentralized manner by local communication, so that a decision can be made locally, i.e., by a given production module, as to which production orders can still be carried out on the restricted production system.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A plurality of control devices, each control device controlling a respective production module for processing or handling a product in a production system comprising a multiplicity of production modules, with each control device comprising:
   a) a settings management module for detecting constraints which must be complied with by operating settings of the respective production module, and for the respective generation of a constraint data record which specifies a detected constraint and identifies the operating setting restricted thereby, wherein the settings management module is configured to dynamically detect a product in an interaction area between the respective production module and an adjacent production module of the multiplicity of production modules, to generate a change notification, transmit the change notification to a synchronizing module and/or to the adjacent production module of the multiplicity of production modules in response to such detection, and following the detection to initiate the capture of constraints imposed by interaction of the respective production module with the product,
   b) a data memory for storing a local constraints table with a multiplicity of constraint data records,
   c) the synchronizing module for iterative reading in of first constraint data records of a corresponding constraints table of a first adjacent production module of the multiplicity of production modules, for iterative building of the local constraints table based on the read-in first constraint data records, by synchronizing them with constraint data records stored in the local constraints table, and
      for iterative forwarding of second constraint data records of the local constraints table to a second adjacent production module of the multiplicity of production modules, wherein the second constraint data records includes both the constraint data record generated by the settings management module and the read-in first constraint data records from the first adjacent production module,
      wherein the synchronizing module is configured to determine whether the local constraints table is changed during updating as part of the iterative building, and if the local constraints table is not changed to identify a set of operating settings that satisfy the constraints indicated in the local constraints table, and
   d) a control module for setting the identified set of operating settings.

2. The plurality of control devices as claimed in claim 1, wherein a respective constraint data record comprises an identifier for identifying the operating setting and/or a range indicator or value indicator for specifying the constraint.

3. The plurality of control devices as claimed in claim 1, wherein the settings management module is configured to specifically detect constraints that are imposed by the respective production module itself, and to generate local constraint data records therefrom, and in that the synchronizing module is configured to initialize the local constraints table with the local constraint data records.

4. The plurality of control devices as claimed in claim 1, wherein the settings management module is configured to specifically detect constraints imposed by interaction between the respective production module and the product and/or the adjacent production module, and to generate interaction-related constraint data records therefrom, and in that the synchronizing module is configured to synchronize the interaction-related constraint data records with the constraint data records stored in the local constraints table.

5. The plurality of control devices as claimed in claim 1, wherein the synchronizing module is configured to identify constraints relating to the respective same operating setting from constraint data records for synchronizing said constraint data records and to combine the identified constraint data records in an overall constraint for this operating setting, and to store a constraint data record indicating the overall constraint in the local constraints table.

6. The plurality of control devices as claimed in claim 1, wherein the settings management module is configured to dynamically detect an adjacent production module, to generate a change notification in response to such detection, and to transmit the change notification to the synchronizing module and/or an adjacent production module.

7. The plurality of control devices as claimed in claim 6, wherein the settings management module is configured to initiate the capture of constraints imposed by interaction of the respective production module with the adjacent production module following such detection.

8. The plurality of control devices as claimed in claim 1, wherein the synchronizing module is configured to perform an iteration step in response to receipt of a change notification when the first constraint data records are read in, when the local constraints table is built and/or when the second constraint data records are forwarded.

9. The plurality of control devices as claimed in claim 1, wherein the local constraints table contains version information which is changed in response to receipt of a change notification and/or in response to a performance of an iteration step when the first constraint data records are read in, when the local constraints table is built and/or when the second constraint data records are forwarded.

10. The plurality of control devices as claimed in claim 9, wherein the version information specifies a version of the local constraints table and/or indicates the versions of corresponding constraints tables of adjacent production modules on which the local constraints table is based.

11. The plurality of control devices as claimed in claim 9, wherein the synchronizing module is configured to compare the version information of the local constraints table with a version of a respective first constraint data record when building said local constraints table, and to update the local constraints table and/or forward one of the second constraint data records depending on said comparison.

12. The plurality of control devices as claimed in claim 1, wherein at least one of the constraint data records contains an origin notification regarding a constraint, which origin notification indicates which production module of the multiplicity of production modules is the source of this constraint, and wherein the synchronizing module is configured to specifically update a constraint data record with the origin notification indicating the indicated production module upon receipt of a change notification relating to the indicated production module.

13. A plurality of production modules, wherein each production module has a control device of the plurality of control devices as claimed in claim 1.

14. A method for operating a first control device of a plurality of control devices, each control device associated with a production module, wherein the first control device is associated with a first production module, comprising:

a) constraints that must be complied with by operating settings of the first production module are detected and a constraint data record specifying a detected constraint and identifying the operating setting restricted thereby is generated for each, wherein a product is dynamically detected in an interaction area between the first production module and an adjacent production module of the multiplicity of production modules, a change notification is generated in response to such detection, the change notification is transmitted to a synchronizing module and/or the adjacent production module, and a capture of constraints imposed by interaction of the production module with the product is initiated in response to the detection, b) a local constraints table with a multiplicity of constraint data records is stored, c) first constraint data records of a corresponding constraints table of a first adjacent production module are read in iteratively, d) the local constraints table is built iteratively based on the read-in first constraint data records, by synchronizing them with constraint data records stored in the local constraints table, e) second constraint data records of the local constraints table are iteratively forwarded to a second adjacent production module, wherein the second constraint data records includes both the constraints generated in step a) and the read-in first constraint data records from the first adjacent production module, and f) an operating setting is set according to a constraint data record of the local constraints table which identifies said operating setting.

15. A computer program product comprising a computer readable hardware storage device having computer readable program code stored therein, said program code executable by a processor of a computer system to implement a method as claimed in claim 14.

16. A computer system comprising one or more processors, one or more memory devices couples to the one or more processors, and a computer-readable storage medium with a computer program product as claimed in claim 15 executable by the one or more processors via the one or more memory devices.

* * * * *